United States Patent
Banks et al.

(10) Patent No.: US 9,133,898 B2
(45) Date of Patent: Sep. 15, 2015

(54) HEAVY DUTY STAMPED SPIDER

(71) Applicant: Bendix Spicer Foundation Brake LLC, Elyria, OH (US)

(72) Inventors: Daniel E. Banks, Climax, MI (US); Troy A. Flodin, Caledonia, MI (US); Brian E. St. John, Charlotte, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 26 days.

(21) Appl. No.: 13/968,640

(22) Filed: Aug. 16, 2013

(65) Prior Publication Data
US 2015/0047931 A1    Feb. 19, 2015

(51) Int. Cl.
| F16D 65/09 | (2006.01) |
| F16D 51/20 | (2006.01) |
| F16D 51/00 | (2006.01) |
| F16D 125/30 | (2012.01) |

(52) U.S. Cl.
CPC ............... *F16D 65/09* (2013.01); *F16D 51/20* (2013.01); *F16D 2051/003* (2013.01); *F16D 2125/30* (2013.01); *F16D 2200/0004* (2013.01); *F16D 2200/0082* (2013.01)

(58) Field of Classification Search
CPC ......... F16D 65/00; F16D 65/09; F16D 65/22; F16D 2125/30; F16D 2125/60; F16D 51/20; F16D 51/22; F16D 51/24
USPC ......... 188/206 R, 341, 74, 205 R, 330, 206 A
See application file for complete search history.

(56) References Cited

U.S. PATENT DOCUMENTS

| 2,912,068 | A |   | 11/1959 | House |
| 4,296,845 | A | * | 10/1981 | Roberts ......................... 188/341 |
| 4,445,597 | A |   | 5/1984 | Baltare |
| 4,526,254 | A |   | 7/1985 | Baltare |
| 4,552,254 | A |   | 11/1985 | Baltare |
| 4,858,730 | A | * | 8/1989 | Baroni ...................... 188/205 R |
| 5,325,945 | A | * | 7/1994 | Walker ......................... 188/341 |

(Continued)

FOREIGN PATENT DOCUMENTS

FR    2931914 A1    12/2009

OTHER PUBLICATIONS

"Bendix Standard Service Brakes, Extended Service Brakes & Reduced Envelope Brakes—Illustrated Parts List," Bendix Spicer Foundation Brake LLC pp. 14-15 and 96-100 (Dec. 2007).
International Search Report issued in corresponding International (PCT) Patent Application No. PCT/US2014/050812 (Jan. 30, 2015).
Written Opinion issued in corresponding International (PCT) Patent Application No. PCT/US2014/050812 (Jan. 30, 2015).

*Primary Examiner* — Anna Momper
*Assistant Examiner* — San Aung
(74) *Attorney, Agent, or Firm* — Reising Ethington P.C.

(57) ABSTRACT

A brake spider for a drum brake is provided. The brake spider includes a mounting portion configured for mounting the spider to a vehicle frame and an anchor pin support portion extending from the mounting portion. The mounting portion defines an aperture centered about a first axis and configured to receive a vehicle axle extending therethrough along the first axis. The anchor pin support portion includes a pin receiving section defining a bore centered about a second axis and configured to receive an anchor pin extending therethrough along the second axis. The pin support portion further includes bracket support sections extending axially from opposite sides of the pin receiving section. The bracket support sections face one another and diverge from one another approaching the mounting portion of the spider.

30 Claims, 7 Drawing Sheets

(56) References Cited

U.S. PATENT DOCUMENTS

| | | |
|---|---|---|
| 6,148,968 A | 11/2000 | Davison |
| 7,543,692 B2 | 6/2009 | Clark et al. |
| 2003/0106750 A1* | 6/2003 | Catania .......................... 188/74 |
| 2006/0021834 A1* | 2/2006 | Kwasniewski ................ 188/329 |
| 2007/0051570 A1 | 3/2007 | Hendrickson |
| 2007/0131502 A1* | 6/2007 | Clark et al. ................... 188/330 |
| 2010/0193303 A1 | 8/2010 | Li et al. |

\* cited by examiner

HEAVY DUTY STAMPED SPIDER

BACKGROUND OF THE INVENTION a. Field of the Invention

This invention relates to a brake spider for a drum brake. In particular, the invention relates to a brake spider having improved formability, stiffness, strength and clearance as compared to conventional brake spiders.

b. Background Art

In a conventional drum brake, a brake drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam or hydraulic piston or wedge to move the brake shoes between positions of engagement and disengagement with the braking surface of the brake drum.

Because of the significant loads imposed on the brake spider in certain heavy vehicles (e.g., vehicles with axles configured to bear weights of 26,000 pounds or more) and/or applications (e.g., school buses), brake spiders in such vehicles or applications have typically been manufactured by casting. Cast brake spiders, however, are relatively heavy and expensive to manufacture leading to undesirable weight and costs for vehicle manufacturers and operators. Lighter, stamped brake spiders have been used with lighter vehicles and/or less intense applications where the spiders are subject to lower loads, but have not been capable of use with heavier vehicles or more intense applications because they are unable to handle the more significant loads associated with such vehicles and applications.

The inventors herein have recognized a need for a brake spider that will minimize and/or eliminate one or more of the above-identified deficiencies.

BRIEF SUMMARY OF THE INVENTION

The present invention relates to a brake spider for a drum brake. In particular, the invention relates to a brake spider having improved formability, stiffness, strength and clearance as compared to conventional brake spiders.

A brake spider for a drum brake in accordance with one embodiment of the present invention includes a mounting portion configured for mounting the spider to a vehicle frame. The mounting portion defines an aperture centered about a first axis and configured to receive a vehicle axle extending therethrough along the first axis. The brake spider further includes an anchor pin support portion extending from the mounting portion. The anchor pin support portion includes a pin receiving section defining a bore centered about a second axis and configured to receive an anchor pin extending therethrough along the second axis. The anchor pin support portion further includes first and second bracket support sections extending axially from opposite sides of the pin receiving section. The first and second bracket support sections face one another and continuously diverge from one another moving from a first line extending between the first and second bracket support sections and disposed on a first side of the second axis to a second line extending between the first and second bracket support sections and disposed on a second side of the second axis.

A vehicle drum brake in accordance with one embodiment of the present invention includes a brake spider. The brake spider includes a mounting portion configured for mounting the spider to a vehicle frame. The mounting portion defines an aperture centered about a first axis and configured to receive a vehicle axle extending therethrough along the first axis. The brake spider further includes an anchor pin support portion extending from the mounting portion. The anchor pin support portion includes a pin receiving section defining a bore centered about a second axis and configured to receive an anchor pin extending therethrough along the second axis. The anchor pin support portion further includes first and second bracket support sections extending axially from opposite sides of the pin receiving section. The first and second bracket support sections face one another and continuously diverge from one another moving from a first line extending between the first and second bracket support sections and disposed on a first side of the second axis to a second line extending between the first and second bracket support sections and disposed on a second side of the second axis. The brake further includes first and second brake shoes. Each of the first and second brakes shoes has a first end pivotally coupled to the anchor pin and a second end configured for engagement by an actuating member. Movement of the actuating member causes the first and second brake shoes to move between positions of engagement and disengagement with a braking surface.

A brake spider in accordance with the present invention represents an improvement relative to conventional brake spiders. The geometry of the inventive brake spider makes it easier to form the spider, yet also improves the stiffness and strength of the spider. As a result, the spider can be made by stamping rather than casting despite its use in vehicles and applications where the spider must bear relatively heavy loads. The resulting stamped spider is less expensive to manufacture and is lighter than conventional cast brakes spiders used in such vehicles and applications. In accordance with certain embodiments of the invention, the brake spider also allows for improved clearances near the mounting bolts used to mount the spider to the vehicle frame and near the vehicle axle flange.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
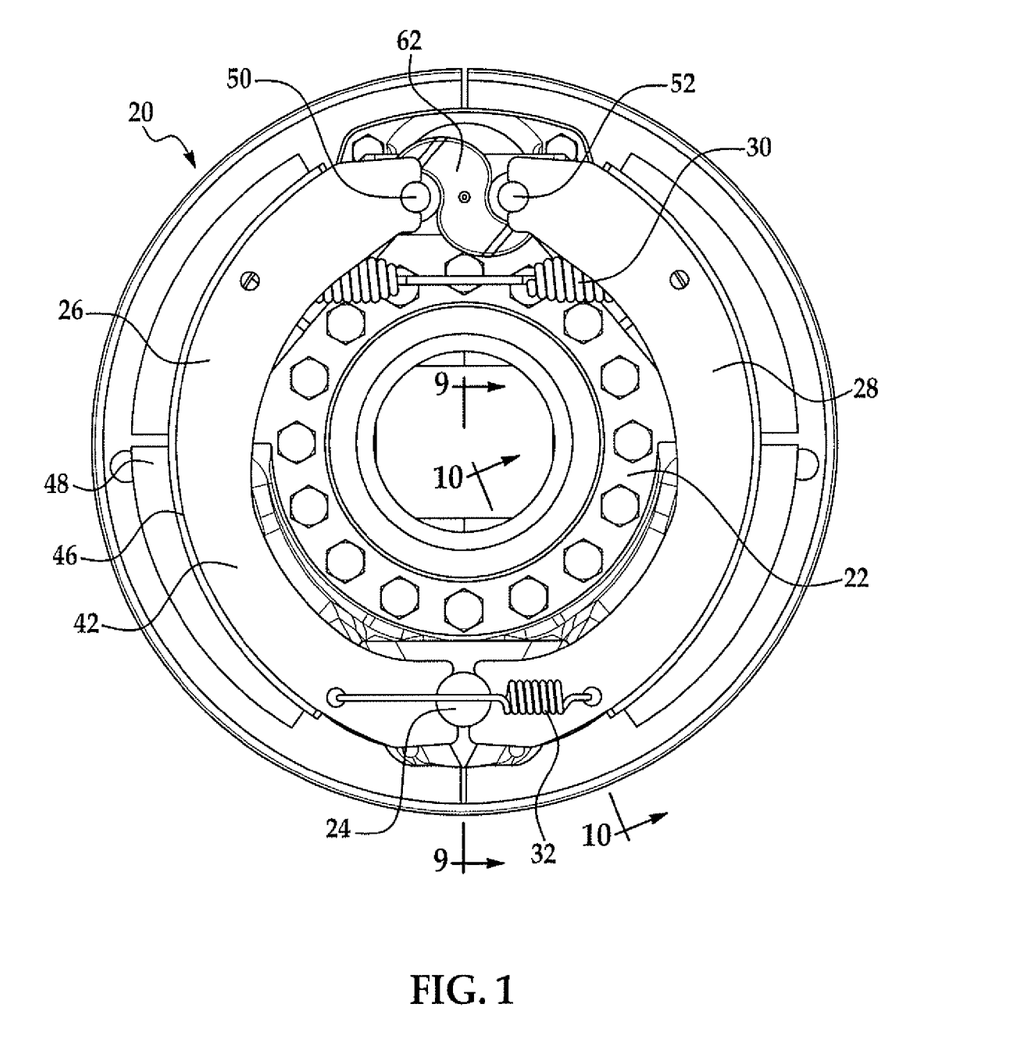
FIG. 1 is a plan view of a brake in accordance with one embodiment of the present invention.
Figure 2:
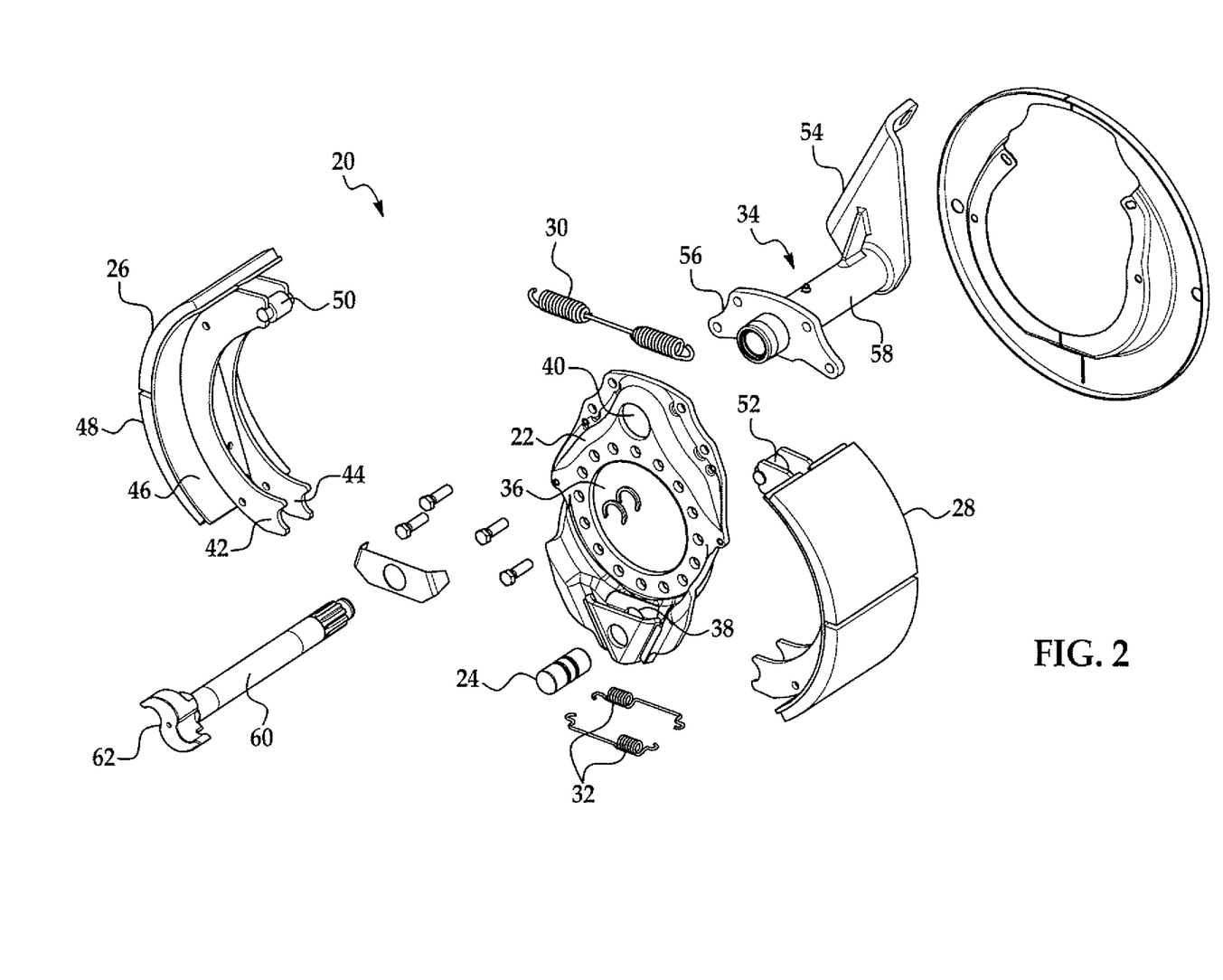
FIG. 2 is an exploded perspective view of the brake of FIG. 1.

Referring now to the drawings wherein like reference numerals are used to identify identical components in the various views, FIGS. 1-2 illustrate a brake 20 in accordance with one embodiment of the present invention. Brake 20 is particularly adapted for use in heavy vehicles. It should be understood, however, that brake 20 may be used on a wide variety of vehicles and in non-vehicular applications. Brake 20 is configured to act against an annular brake drum (not shown) that rotates with the vehicle wheel or wheels at one end of an axle (not shown). Brake 20 may include a brake spider 22, an anchor pin 24, brake shoes 26, 28, return and retaining springs 30, 32, and an actuating assembly 34.

Spider 22 is provided to mount the various components of brake 20. Spider 22 defines a central aperture 36 through which the vehicle axle may extend. Spider 22 may further define bores 38, 40, on either side of aperture 36 configured to receive anchor pin 24 and a portion of actuating assembly 34. Spider 22 is described in greater detail hereinbelow.

Anchor pin 24 is provided to pivotally mount brake shoes 26, 28 to brake spider 22. Anchor pin 24 may comprise a round pin and may be received within bore 38 of spider 22.

Brake shoes 26, 28 are provided for selective engagement with a braking surface of a drum (not shown) in order to apply a braking torque to the drum and one or more vehicle wheels. Each brake shoe 26, 28 may include a pair of spaced webs 42, 44, a brake table 46, and one or more brake linings 48. Webs 42, 44 support brake table 46 and may extend generally parallel to one another. Webs 42, 44 may be made from metals and metal alloys such as steel. Webs 42, 44 are arcuate in shape and extend between opposite ends of brake shoes 26, 28. Webs 42, 44 may be secured to brake table 46 using welds or other conventional fastening means. Each web 42, 44 may define semicircular recesses at either end configured to receive pin 24 and a corresponding one of cam followers 50, 52. Webs 42, 44 may also provide a connection point for return spring 30 and retaining springs 32. Brake table 46 is provided to support brake linings 48. Table 46 may be made from conventional metals and metal alloys including steel and may be arcuate in shape. Brake linings 48 are provided for frictional engagement with the braking surface of the drum. Linings 48 may be made from conventional friction materials. Brake linings 48 may be secured to brake table 46 using a plurality of rivets or other conventional fasteners.

Return spring 30 is provided to bias brake shoes 26, 28 to a position of disengagement from the braking surface. Retainer springs 32 are provided to retain brake shoes 26, 28—and particularly webs 42, 44—on anchor pin 24. Springs 30, 32 are conventional in the art. The ends of springs 30, 32 extend through corresponding apertures in webs 42, 44 of brake shoe shoes 26, 28.

Actuating assembly 34 is provided to cause movement of brake shoes 26, 28 between positions of engagement with and disengagement from the braking surface of the drum. In the illustrated embodiment, actuating assembly 34 includes a conventional doubled lobed S-cam actuator. It should be understood, however, that conventional fluid actuated pistons or a wedge type mechanism may also be employed to move shoes 26, 28 between positions of engagement with and disengagement from the braking surface. Assembly 34 includes a brake actuator mounting bracket 54 and camshaft bracket flange 56 configured to support opposite ends of a camshaft tube 58. Assembly 34 further includes a camshaft 60 disposed within tube 58 and supporting a cam 62 at one end. Cam followers 50, 52 follow the surface of cam 62 as it rotates thereby causing shoes 26, 28 to pivot about an axis defined by anchor pin 24. The opposite end of camshaft 60 is configured for coupling to a conventional spring and/or fluid controlled brake actuator (not shown)—often through an intermediary slack adjuster (not shown)—that controls rotation of camshaft 60.

Figure 3:
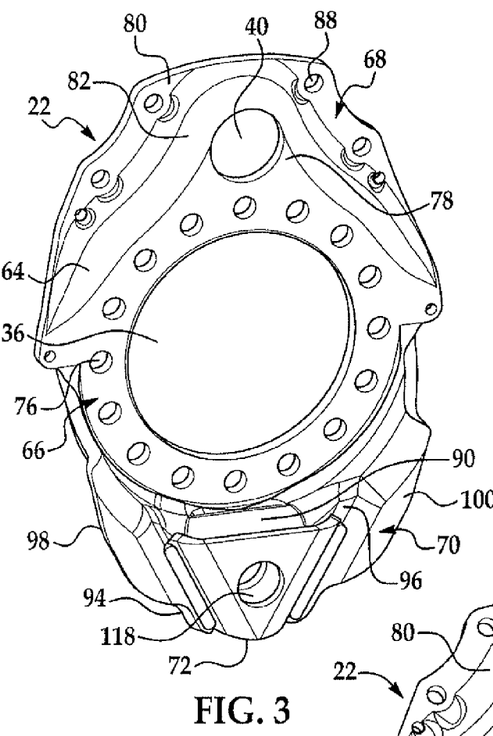
FIGS. 3-4 are perspective views of a brake spider in accordance with one embodiment of the present invention.
Figure 4:
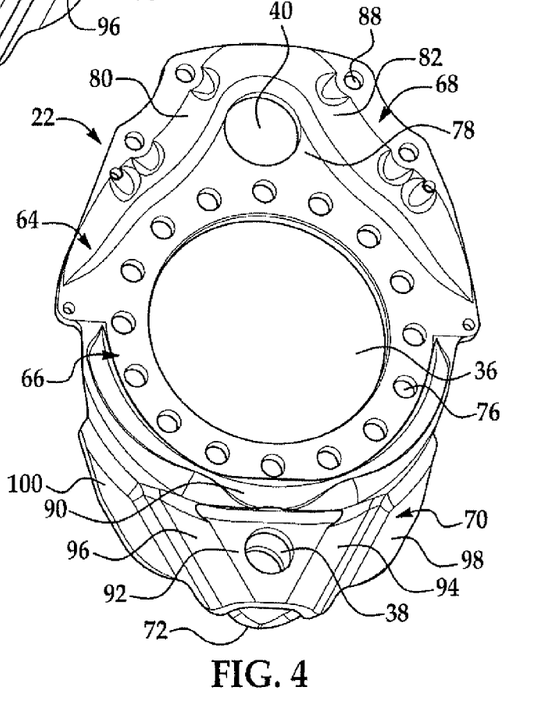

Referring now to FIGS. 3-8, spider 22 will be described in greater detail. Spider 22 may be made from conventional metals and metal alloys. In accordance with one aspect of the present invention, spider 22 may be formed through stamping, yet is suitable for use with heavy vehicles and in applications in which spider 22 is subject to relatively high loads. Referring to FIGS. 3-4, spider 22 includes a body 64 having a mounting portion 66, an actuator support portion 68 and an anchor pin support portion 70 and a pin support bracket 72 coupled to body 64.

Figure 5:
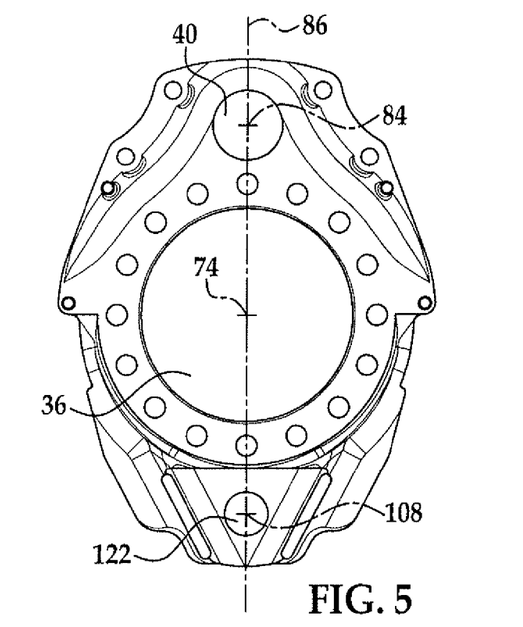
FIGS. 5-7 are plan views of the brake spider of FIGS. 3-4.
Figure 6:
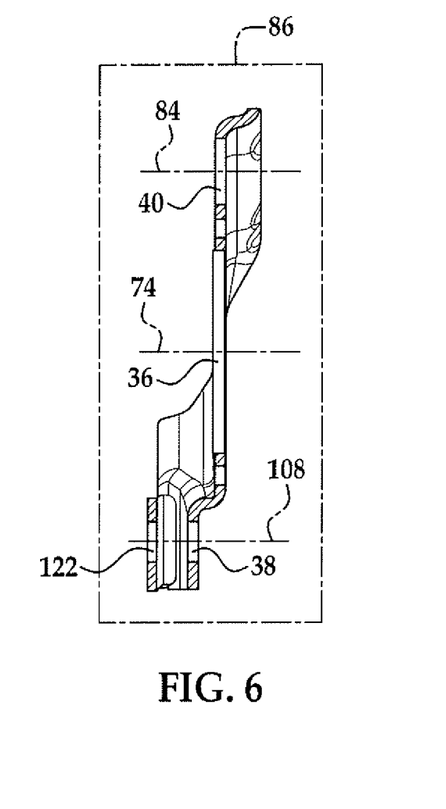
Figure 7:
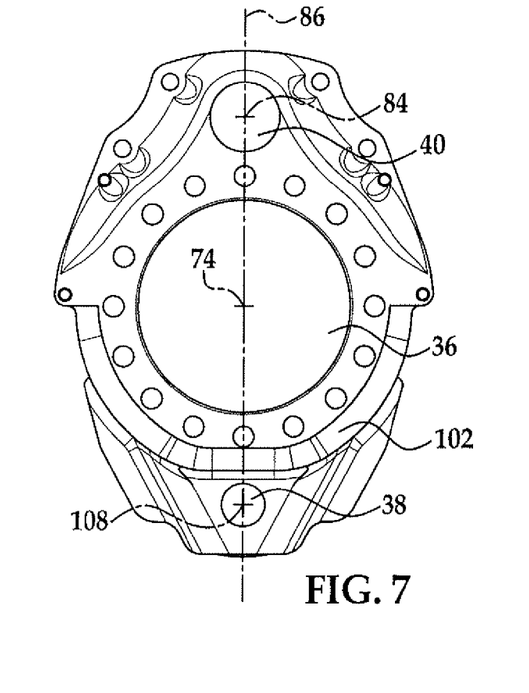

Mounting portion 66 is configured for mounting spider 22 to a vehicle frame. Portion 66 is generally annular in shape and defines central aperture 36. Referring to FIGS. 5-7, aperture 36 is centered about an axis 74 and is configured to receive a vehicle axle extending therethrough along axis 74. Referring again to FIGS. 3-4, mounting portion 64 further defines a plurality of smaller apertures 76 surrounding aperture 36 and configured to receive bolts or other fasteners through which spider 22 is mounted to the vehicle frame.

Actuator support portion 68 is configured to support and position one or more components of actuating assembly 34. Portion 68 extends from mounting portion 66 on an opposite side of mounting portion 66 relative to anchor pin support portion 70. Portion 68 defines a camshaft receiving section 78, a camshaft bracket flange receiving section 80 and a transition section 82 extending between the sections 78, 80. Section 78 extends radially from mounting portion 66. As used herein in connection with spider 22, when it is said that a portion or section of spider 22 extends radially, it is meant that the portion or section extends, relative to axis 74, further radially than axially. Similarly, when it is said that a portion or section of spider 22 extends axially, it is meant that the portion or section extends, relative to axis 74, further axially than radially. Referring again to FIGS. 5-7, section 78 defines bore 40 which is centered about an axis 84 and through which camshaft 60 extends. Axis 84 may extend parallel to axis 74 and may be disposed in a common plane 86. Referring again to FIGS. 3-4, section 80 also extends radially from an opposite end of axially extending transition section 82 relative to section 78 such that sections 78, 80 are axially spaced. Section 80 defines a plurality of apertures 88 configured to receive bolts or other fasteners through which section 80 is couple to camshaft bracket flange 56. In accordance with one aspect of the present invention, the geometry of spider 22 provides improved clearance for the fasteners coupling portion 68 of spider 22 to camshaft bracket flange 56.

Anchor pin support portion 70 is configured to support anchor pin 24. In accordance with one aspect of the present invention, portion 70 is also configured to provide increased strength and stiffness to spider 22 while also improving the formability of spider 22 relative to conventional spiders. Portion 70 extends from mounting portion 66 on an opposite side of mounting portion 66 relative to actuator support portion 68. Portion 70 includes a transition section 90, pin receiving section 92, a pair of bracket support sections 94, 96, and a pair of wing sections 98, 100. Portion 70 and/or sections 90, 92, 94, 96, 98, 100 of portion 70 may be symmetrical about plane 86.

Figure 8:
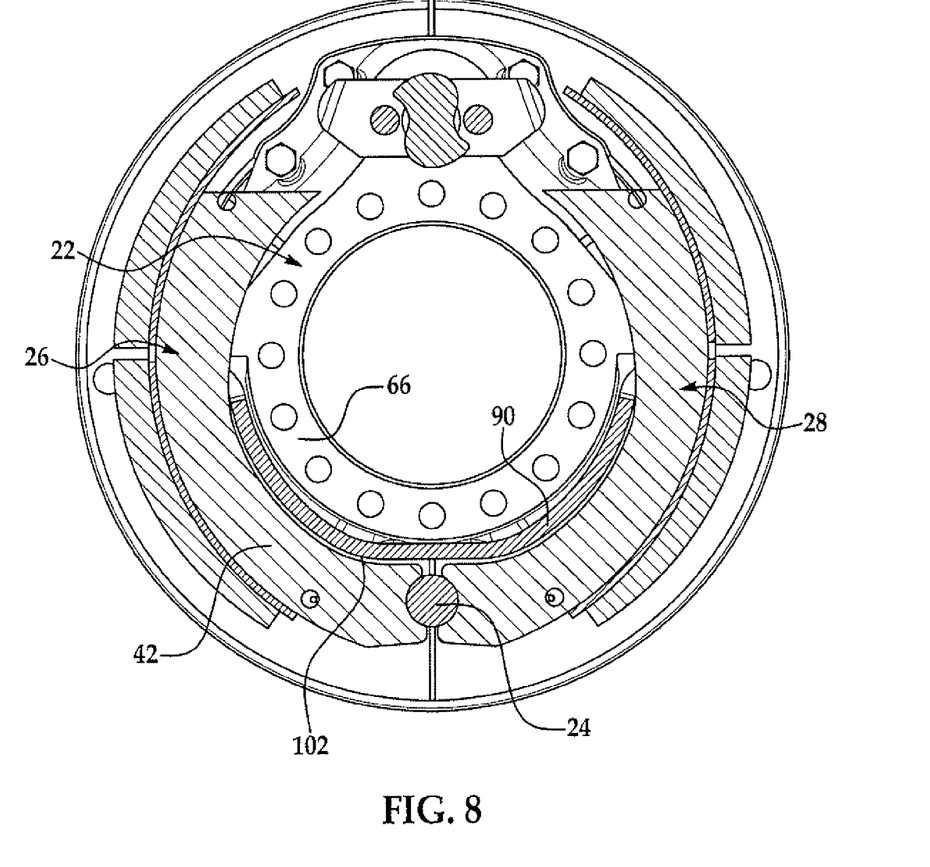
FIG. 8 is a sectional view of the brake of FIGS. 1-2.
Figure 9:
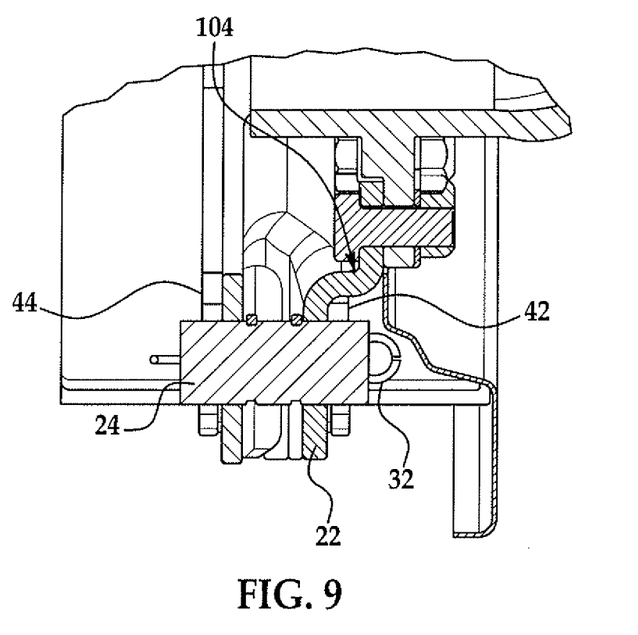
FIGS. 9-10 are sectional views of the brake of FIGS. 1-2 taken along lines 9-9 and 10-10, respectively, in FIG. 1.
Figure 10:
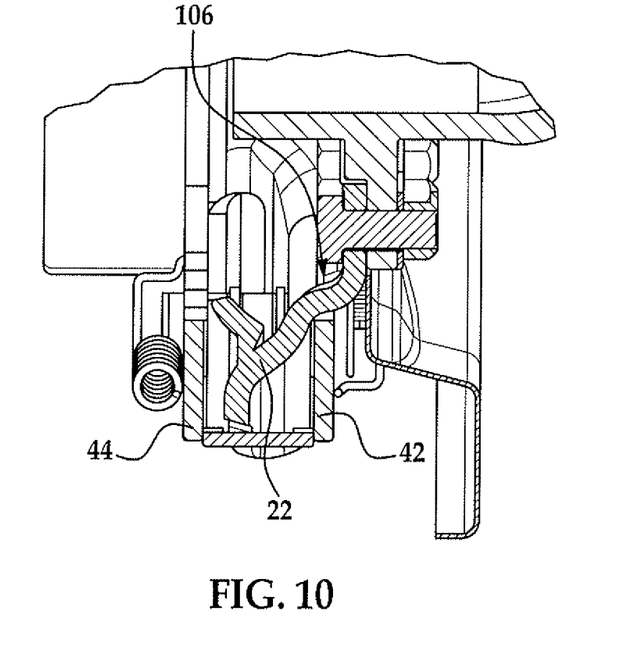

Transition section 90 extends axially between mounting portion 66 and pin receiving section 92 such that mounting portion 66 and pin receiving section 92 are axially spaced from one another. Transition section 90 extends from a portion of a radially outer perimeter of mounting portion 66 an extends in an opposite axial direction relative to transition section 92 of actuator support portion 68. In accordance with one aspect of the present invention, transition section 90 defines a radially outer surface 102 (see FIG. 5) that is non-circular and may be formed by coining spider 22. Referring to FIG. 8, the outer surface 102 has a shape that is complementary to the shape or radially inner profile of webs 42, 44 of brake shoes 26, 28 as opposed to having shape that is circular and conforms to the contour of the axle. Referring to FIGS. 9-10, the non-circular shape of surface 102 and section 90 allows the fillet radii 104, 106 of section 90 to vary and, in particular, for fillet radii 106 to be greater than fillet radii 104 and improves draft angles within section 90. As a result, less strain is placed on the material of spider 22 during forming, the force required during manufacturing is reduced and special manufacturing operations are eliminated thereby improving manufacturability and the integrity and strength of spider 22.

Pin receiving section 92 is configured to support anchor pin 24. Section 92 extends radially from one axial end of transition section 90 opposite mounting portion 66 of spider 22. Referring to FIGS. 5-7, section 92 defines bore 38 which may be centered about an axis 108 and is configured to receive anchor pin 24 extending through bore 38 along axis 108. Axis 108 may extend parallel to one or both of axis 74 and axis 84 and may be disposed in a common plane 86 (see FIG. 6). In the illustrated embodiment, spider 22 and pin receiving section 92 are configured for use with a single anchor pin 24. It should be understood, however, that spider 22 and pin receiving section 92 could alternatively be configured for use with multiple anchor pins 24 (i.e. in which each brake shoe 26, 28 engages a separate anchor pin 24). In a multiple anchor pin embodiment, the bores in section 92 configured to receive the respective anchor pins may be disposed on opposite sides of plane 86.

Figures 11, 12:
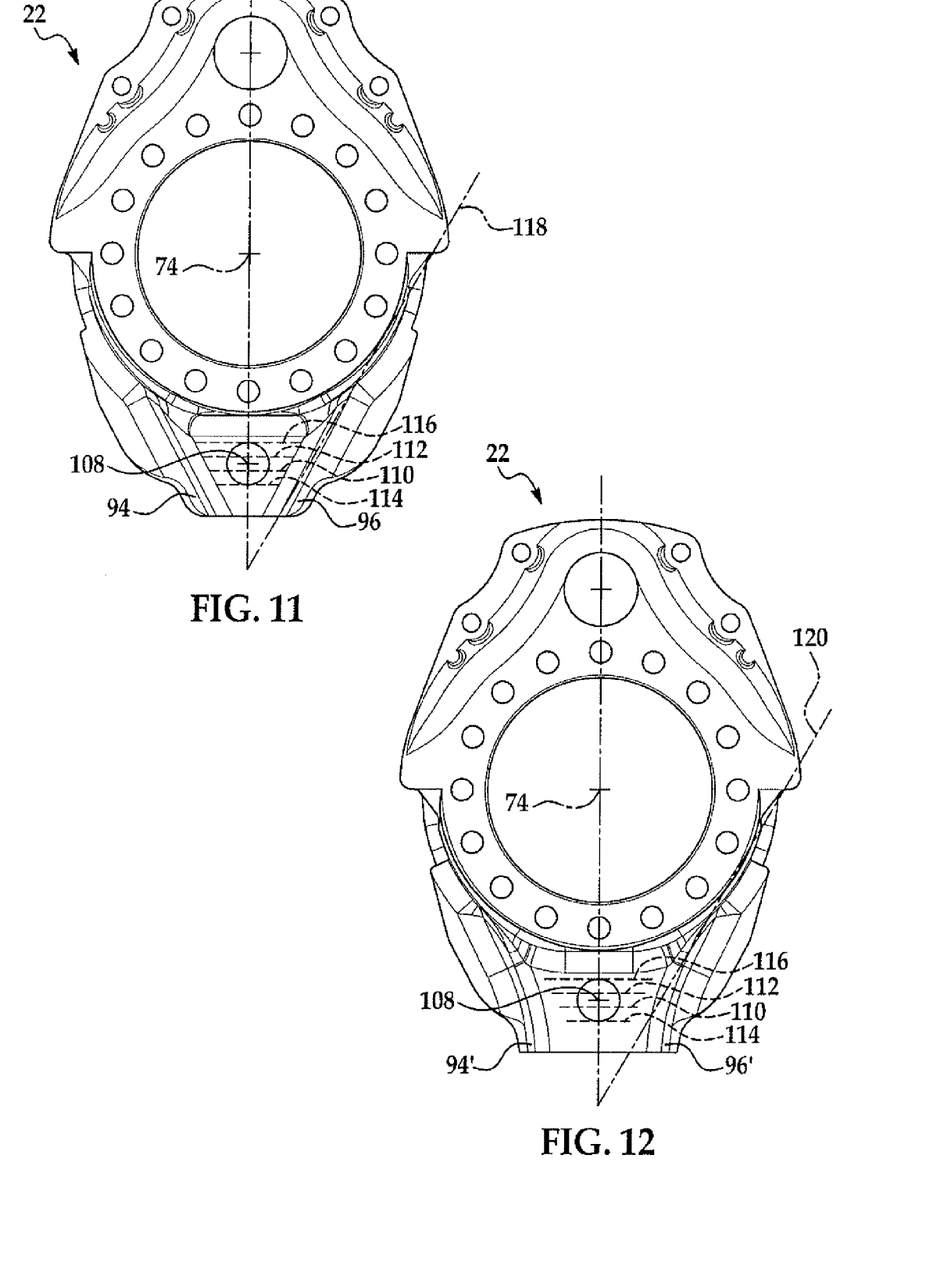
FIG. 11 is a plan view of a portion of the brake spider of FIGS. 3-7.
FIG. 12 is a plan view of a portion of a brake spider in accordance with another embodiment of the present invention.

Bracket support sections 94, 96 extend axially from opposite sides of pin receiving section 92 and face one another. In accordance with one aspect of the present invention, sections 94, 96 continuously diverge from one another along at least a portion of the length of sections 94, 96 (sections 94, 96 may, for example, form an angle of between 1 and 45 degrees). In particular, and with reference to FIG. 11, sections 94, 96 may continuously diverge from one another moving from a line 110 extending between sections 94, 96 on one side of axis 108 (in particular, on a side of axis 108 further from axis 74) to a line 112 extending between sections 94, 96 on an opposite side of axis 108 (in particular, on a side of axis 108 nearer to axis 74). Sections 94, 96 may further continuously diverge from one another moving from a line 114 extending between sections 94, 96 and disposed on a first side of bore 38 (in particular, on a side of bore 38 further from axis 74) to a line 116 extending between sections 94, 96 and disposed on an opposite side of bore 38 (in particular, on a side of bore 38 nearer to axis 74). Lines 114, 116 for example, may extend through diametrically opposite circumferential points of bore 38 furthest from and nearest to, respectively, axis 74. Sections 94, 96 may further continuously diverge from another moving from one longitudinal end of each section 94, 96 to an opposite longitudinal end of sections 94, 96 (i.e. along the entire length of sections 94, 96). As illustrated in FIG. 11, sections 94, 96 may be substantially linear in cross-section such that the rate of divergence over any given portion of sections 94, 96 (e.g., between lines 110, 112 or between lines 114, 116 or between the longitudinal ends of sections 94, 96) is constant. Referring to FIG. 12, in an alternative embodiment of the invention, a portion or all of sections 94', 96' may be non-linear and the rate of divergence over any given portion of sections 94', 96' (e.g., between lines 100, 102 or between lines 114, 116 or between the longitudinal ends of sections 94', 96') may vary and, in particular, may increase moving from a point further from axis 74 to a point nearer to axis 74. Because sections 94, 96 or 94', 96' diverge from one another, portion 70 of spider 22 forms a relatively wide angle of attachment to portion 66 of spider 22 and improves the strength and stiffness of spider 22. The angle of each section 94, 96 or 94', 96' relative to plane 86 may vary. Referring to FIGS. 11-12, in some embodiments, a line 118 (FIG. 11) or 120 (FIG. 12) extending from plane 86 along sections 94, 96 (FIG. 11) or through a point on the radially outer surface of sections 94, 96 or 94', 96' (FIGS. 11-12) is tangent to a radially outer perimeter of mounting portion 66.

Wing sections 98, 100 extend radially from transition section 90 and bracket support sections 94, 96. Sections 98, 100 are disposed at one axial end of bracket support sections 94, 96, respectively, opposite the axial end of sections 94, 96 connected to pin receiving section 92 such that wing sections 98, 100 and pin receiving section 92 are axially spaced from one another. The width of wing sections 98, 100 tapers near either longitudinal end of sections 98, 100 and is widest intermediate the longitudinal ends of sections 98, 100.

Referring again to FIG. 5, pin support bracket 72 defines a bore 122 configured to receive anchor pin 24. Bore 122 may be axially aligned with bore 38 of pin receiving section 92 along axis 108 and may be axially spaced from bore 38. Bracket 72 is configured to be coupled to bracket support sections 94, 96 of pin support portion 70 through welding.

A brake 20 in accordance with the present invention represents an improvement relative to conventional brake spiders. The geometry of the inventive brake spider 22 makes it easier to form the spider 22, yet also improves the stiffness and strength of the spider 22. As a result, the spider 22 can be made by stamping rather than casting despite its use in vehicles and applications where the spider 22 must bear relatively heavy loads. The resulting stamped spider 22 is less expensive to manufacture and is lighter than conventional cast brakes spiders used in such vehicles and applications. In accordance with certain embodiments of the invention, the brake spider 22 also allows for improved clearances near the mounting bolts used to mount the spider 22 to the vehicle frame and near the vehicle axle flange (see, e.g., FIGS. 9-10).

While the invention has been shown and described with reference to one or more particular embodiments thereof, it will be understood by those of skill in the art that various changes and modifications can be made without departing from the spirit and scope of the invention.

What is claimed is:

1. A brake spider for a drum brake, comprising:
   a mounting portion configured for mounting said spider to a vehicle frame, said mounting portion defining an aperture centered about a first axis and configured to receive a vehicle axle extending therethrough along said first axis; and,
   an anchor pin support portion extending from said mounting portion and including
      a pin receiving section defining a bore centered about a second axis and configured to receive an anchor pin extending therethrough along said second axis; and,
      first and second bracket support sections extending axially from opposite sides of said pin receiving section, said first and second bracket support sections facing one another and continuously diverging from one another in the direction of the second axis and moving from a first line extending between said first and second bracket support sections and disposed on a first side of said second axis to a second line extending between said first and second bracket support sections and disposed on a second side of said second axis.

2. The brake spider of claim 1 wherein said first and second bracket support sections continuously diverge from one another moving from a first line extending between said first and second bracket support sections and disposed on a first side of said bore to a second line extending between said first and second bracket support sections and disposed on a second side of said bore diametrically opposite said first side.

3. The brake spider of claim 1 wherein said first and second bracket support sections continuously diverge from one another moving from a first line extending between said first and second bracket support sections and through a first circumferential point of said bore furthest from said axis to a second line extending between said first and second bracket support sections and through a second circumferential point of said bore nearest said axis.

4. The brake spider of claim 1 wherein said first and second bracket support sections continuously diverge from one another moving from one end of said first and second bracket support sections to another end of said first and second bracket support sections.

5. The brake spider of claim 1 wherein a rate of divergence between said first and second bracket support sections is constant between said first and second lines.

6. The brake spider of claim 1 wherein a rate of divergence between said first and second bracket support sections varies between said first and second lines.

7. The brake spider of claim 6 wherein said rate of divergence increases moving from said first line to said second line.

8. The brake spider of claim 1 wherein said anchor pin support portion further includes a first wing section extending radially from said first bracket support section and a second wing section extending radially from said second bracket support section.

9. The brake spider of claim 8 wherein said pin receiving section is disposed at a first axial end of said first bracket support section and a first axial end of said second bracket support section, said first wing section is disposed at a second axial end of said first bracket support portion opposite said first axial end of said first bracket support portion and said second wing section is disposed at a second axial end of said second bracket support portion opposite said first axial end of said second bracket support portion.

10. The brake spider of claim 1 wherein said anchor pin support portion further includes a transition section extending axially from a portion of a radially outer perimeter of said mounting portion, said transition section having a non-circular radially outer surface.

11. The brake spider of claim 10 wherein said transition section extends between said mounting portion and said pin receiving section, said mounting portion and said pin receiving section axially spaced from one another.

12. The brake spider of claim 1 further comprising a bracket coupled to said first and second bracket support portions, said bracket defining a bore configured to receive said anchor pin and aligned with and axially spaced from said bore of said pin receiving section.

13. The brake spider of claim 1 wherein said first and second bracket support sections are symmetrical about a plane extending through said first and second axes.

14. The brake spider of claim 1 wherein a line extending from a plane extending through said first and second axes through a point on a radially outer surface of said first bracket support section is tangent to a radially outer perimeter of said mounting portion.

15. The brake spider of claim 1 further comprising an actuator support portion extending from said mounting portion on an opposite side of said mounting portion relative to said anchor pin support portion.

16. A vehicle drum brake, comprising:
a brake spider comprising
a mounting portion configured for mounting said spider to a vehicle frame, said mounting portion defining an aperture centered about a first axis and configured to receive a vehicle axle extending therethrough along said first axis; and,
an anchor pin support portion extending from said mounting portion and including
a pin receiving section defining a bore centered about a second axis and configured to receive an anchor pin extending therethrough along said second axis; and,
first and second bracket support sections extending axially from opposite sides of said pin receiving section, said first and second bracket support sections facing one another and continuously diverging from one another in the direction of the second axis and moving from a first line extending between said first and second bracket support sections and disposed on a first side of said second axis to a second line extending between said first and second bracket support sections and disposed on a second side of said second axis; and,
first and second brake shoes, each of said first and second brakes shoes having a first end pivotally coupled to said anchor pin and a second end configured for engagement by an actuating member, movement of said actuating member causing said first and second brake shoes to move between positions of engagement and disengagement with a braking surface.

17. The brake of claim 16 wherein said first and second bracket support sections continuously diverge from one another moving from a first line extending between said first and second bracket support sections and disposed on a first side of said bore to a second line extending between said first and second bracket support sections and disposed on a second side of said bore diametrically opposite said first side.

18. The brake of claim 16 wherein said first and second bracket support sections continuously diverge from one another moving from a first line extending between said first and second bracket support sections and through a first circumferential point of said bore furthest from said axis to a second line extending between said first and second bracket support sections and through a second circumferential point of said bore nearest said axis.

19. The brake of claim 16 wherein said first and second bracket support sections continuously diverge from one another moving from one end of said first and second bracket support sections to another end of said first and second bracket support sections.

20. The brake of claim 16 wherein a rate of divergence between said first and second bracket support sections is constant between said first and second lines.

21. The brake of claim 16 wherein a rate of divergence between said first and second bracket support sections varies between said first and second lines.

22. The brake of claim 21 wherein said rate of divergence increases moving from said first line to said second line.

23. The brake of claim 16 wherein said anchor pin support portion further includes a first wing section extending radially from said first bracket support section and a second wing section extending radially from said second bracket support section.

24. The brake of claim 23 wherein said pin receiving section is disposed at a first axial end of said first bracket support section and a first axial end of said second bracket support section, said first wing section is disposed at a second axial end of said first bracket support portion opposite said first axial end of said first bracket support portion and said second wing section is disposed at a second axial end of said second bracket support portion opposite said first axial end of said second bracket support portion.

25. The brake of claim 16 wherein said anchor pin support portion further includes a transition section extending axially from a portion of a radially outer perimeter of said mounting portion, said transition section having a non-circular radially outer surface.

26. The brake of claim 25 wherein said transition section extends between said mounting portion and said pin receiving section, said mounting portion and said pin receiving section axially spaced from one another.

27. The brake of claim 16 further comprising a bracket coupled to said first and second bracket support portions, said bracket defining a bore configured to receive said anchor pin and aligned with and axially spaced from said bore of said pin receiving section.

28. The brake of claim 16 wherein said first and second bracket support sections are symmetrical about a plane extending through said first and second axes.

29. The brake of claim 16 wherein a line extending from a plane extending through said first and second axes through a point on a radially outer surface of said first bracket support section is tangent to a radially outer perimeter of said mounting portion.

30. The brake of claim 16 further comprising an actuator support portion extending from said mounting portion on an opposite side of said mounting portion relative to said anchor pin support portion.

\* \* \* \* \*

UNITED STATES PATENT AND TRADEMARK OFFICE
CERTIFICATE OF CORRECTION

PATENT NO. : 9,133,898 B2  
APPLICATION NO. : 13/968640  
DATED : September 15, 2015  
INVENTOR(S) : Daniel E. Banks et al.

Page 1 of 1

It is certified that error appears in the above-identified patent and that said Letters Patent is hereby corrected as shown below:

In the Claims

In column 7, lines 37, 38, 40 and 41 (claim 9), "portion" should read "section".

In column 7, lines 52-53 (claim 12), "portions" should read "sections".

In column 9, lines 2, 3, 5 and 6 (claim 24), "portion" should read "section".

In column 9, line 17 (claim 27), "portions" should read "sections".

Signed and Sealed this  
Second Day of February, 2016

Michelle K. Lee  
*Director of the United States Patent and Trademark Office*